United States Patent [19]

Mahmud

[11] Patent Number: 5,354,582
[45] Date of Patent: Oct. 11, 1994

[54] METHOD FOR UTILIZING TONER FINES AS AN ELECTROSTATIC SPRAY COATING MATERIAL

[75] Inventor: Meftah U. Mahmud, Nashua, N.H.

[73] Assignee: Nashua Corporation, Nashua, N.H.

[21] Appl. No.: 979,197

[22] Filed: Nov. 20, 1992

[51] Int. Cl.$^5$ .............................................. B05D 1/06
[52] U.S. Cl. .................................................... 427/485
[58] Field of Search ............... 427/475, 485, 195, 474; 430/137; 241/19, 24, 79.1, 80; 118/610, 621, 629

[56] References Cited

U.S. PATENT DOCUMENTS

| | | | |
|---|---|---|---|
| 3,801,348 | 4/1974 | Helm | 427/195 |
| 4,304,360 | 12/1981 | Luhr et al. | 241/19 |
| 4,844,349 | 7/1989 | Kanda et al. | 241/24 |
| 5,016,823 | 5/1991 | Kato et al. | 241/24 |

FOREIGN PATENT DOCUMENTS 2509410  9/1975  Fed. Rep. of Germany ...... 427/485

*Primary Examiner*—Terry J. Owens

[57] ABSTRACT

Method for using fines from toner particle manufacturing which are unacceptable for use in photocopying. Manufactured toner particles are separated into toner particles generally of a size acceptable for photocopying and residue toner particles generally of a size unacceptable for photocopying. The residue toner particles are electrostatically sprayed onto surfaces to form decorative or protective coatings.

4 Claims, 1 Drawing Sheet

METHOD FOR UTILIZING TONER FINES AS AN ELECTROSTATIC SPRAY COATING MATERIAL

BACKGROUND OF INVENTION

This invention pertains to a unique, environment-enhancing, concept for effectively utilizing material which had heretofore been considered to be a waste product.

Modern offices are substantially dependent upon photocopying machines which utilize dry toner material. However, in the manufacture of such material, in order to maintain adequate and proper quality control for photocopying operations, that material produced during the toner manufacturing operation which is smaller than that deemed acceptable for photocopying is discarded as a waste material.

The inability to use the manufactured fines, the manpower and energy requirements involved in removing and disposing of the fines, and the effort involved in finding suitable waste storage sites, produce, in the aggregate, a not insubstantial or inexpensive burden upon toner manufacturers, customers, and the public at large.

This invention uniquely recognizes that the diverted toner fines material may be effectively employed as a dry powder, charge-responsive spray media for coating purposes, thereby avoiding the problems associated with waste material handling and providing a revenue enhancing aspect for the toner manufacturing operation.

As used in the ensuing description and claims, the term "charge-responsive" generally refers to particle spraying techniques wherein a particle is impelled toward and adhered to a surface or article to be coated (or assisted in such impelling and adherence) in response to the presence of an electrical charge. Such a charge may be electrically imparted to spray particles as in the case of conventional, electrostatic spraying, or may be mechanically induced by friction, as in the case of so-called "tribo guns", or otherwise provided with a charge status. Permanent adherence of particles may require the application of particle-fusing heat.

Through this invention, it has been discovered that toner fines or residue discarded in photocopier toner manufacturing operations are particularly amenable to use in charge-responsive, spray coating operations.

It is noted that the charge-responsive spray coating art itself has recognized the possibility of recycling and reusing undeposited dry spray powder materials during spraying operations. Representative of such prior art disclosures are the following:

| PATENT # | PATENTEE | TITLE |
|---|---|---|
| 3,901,184/ Aug. 26, 1975 | Payne et al | Pneumatic Powder Flow Diverting Device |
| 4,212,266/ Jul. 15, 1980 | Payne et al | Catcher And Return Device For Oversprayed Powder |

The substantial disparity in technologies involved in the manufacture of photocopy toner materials and charge-responsive spray coating doubtless has contributed to the failure in the dry toner manufacturing art to recognize the possibilities of utilizing segregated photocopier toner fines as an effective spray coating material. This is especially true since this material is uniquely operable to provide durable and attractive polymeric finishes, often of a lustrous black nature, where the toner material itself is black.

At this juncture, it is also to be recognized that in the prior art there are recognitions of a variety of materials including resin components, additives, etc. which are employed as coating media, representative of which are the following:

| PATENT # | PATENTEE | TITLE |
|---|---|---|
| 2,321,587/ June 15, 1943 | Davie et al | Electrical Conductive Coating |
| 2,718,506/ Sept. 20, 1955 | Elleman | Electrically Conducting Coating Compositions Containing A Nonoxidized Magnetic Metal Powder |
| 2,992,425/ Oct. 12, 1945 | Pratt | Nondirectional, Metal-Backed, Electro-magnetic Radiation-Absorptive Films |
| 3,816,836/ June 11, 1974 | Smith | Shielded Instrument Panel For Use With A Windshield Radio Antenna |
| 4,218,507/ Aug. 19, 1980 | Deffeyes et al | Coated Particles And Process Of Preparing Same |
| 4,474,676/ Oct. 2, 1984 | Ishino et al | Electromagnetic Interference Shielding Material |
| 4,544,571/ Oct. 1, 1985 | Miller | Method Of Manufacture Of EMI/RFI Vapor Deposited Composite Shielding Panel |
| 4,585,901/ Apr. 29, 1986 | Miller | EMI/RFI Vapor Deposited Composite Shielding Panel |
| 4,690,778/ Sep. 1, 1987 | Narumiya et al | Electromagnetic Shielding Material |
| 4,699,743/ Oct. 13, 1987 | Nakamura et al | Method Of Recovering A Heat Shrinkable Magnetic Shielding Article Over An Electrical Component |
| 4,774,270/ Sep. 27, 1988 | Sullivan et al | Coating For EMI Shielding |
| 4,831,210/ May 16, 1989 | Larson et al | Shields For Electro-magnetic Radiation |
| 4,896,001/ Jan. 23, 1990 | Pitts et al | Anti-Electric Protection |
| 4,910,090/ March 20, 1990 | Kuhlman et al | EMI-RFI Shield For Visual Display Terminals |
| 4,923,533/ May 8, 1990 | Shigeta et al | Magnetic Shield-Forming Magnetically Soft Powder, Composition Thereof, And Process Of Making |
| 4,943,477/ Jul. 24, 1990 | Kanamura et al | Conductive Sheet Having Electromagnetic Interference Shielding Function |
| 4,959,752/ Sep. 25, 1990 | Samarov et al | Electronic Module RFI/EMI Shielding |
| 4,971,846/ Nov. 20, 1990 | Lundy | Thermoplastic Cylinder And Process For Manufacturing Same |
| 4,980,564/ Dec. 25, 1990 | Steelmon | Radiation Barrier Fabric |
| 5,028,940 Jul. 2, 1991 | Koskenmaki et al | Metal/Polymer Composites |

In no instance however do these materials comprise segregated toner fines obtained from photocopier manufacturing operations.

In short, insofar as the toner manufacturing art is concerned, there has been a failure to recognize or suggest the present invention and its attendant and several advantages, as discussed above.

SUMMARY OF INVENTION

A prime method aspect of the invention resides in a basic technique for isolating toner fines during a photocopier toner manufacturing operation and appropriately packaging such segregated fines for subsequent charge-responsive spray coating operations. This basic method is characterized as follows:

A method of utilizing a residue portion of manufactured toner particles deemed unacceptable for photocopying, this method comprising the preparation of material for the charge-responsive formation of a coating by:

manufacturing toner particles;
    segregating the manufactured toner particles into
        toner particles of a size acceptable for photocopying, and
        residue toner particles of a relatively smaller size, not deemed acceptable for photocopying purposes;
    diverting the toner particles considered acceptable for photocopying purposes to toner packaging means for the packaging thereof; and
    diverting the relatively smaller size, residue toner particles considered unacceptable for photocopying purposes to coating material preparation means, this coating material preparation means comprising
        means for packaging the residue toner particles in a format suitable for use in charge-responsive spray coating;
    the packaged residue toner particles being operable and suitable for charge-responsive spray coating with charge-responsive spray coating means to form a continuous coating on a substrate with,
        an air gap separating the charge-responsive spray coating means and the substrate and providing an air path through which the residue toner particles are electrostatically projected from the spray coating means to the substrate.

An additional, independently significant method aspect of the invention, entailing the utilization of the segregated and packaged toner fines for charge-responsive spray coating involves, in addition to the foregoing basic method aspect, the following:

supplying the residue toner particles to charge-responsive spray coating means; and
    electrostatically spraying the residue toner particles from the charge-responsive spray coating means to form a continuous coating on a substrate with,
        an air gap separating the charge-responsive spray coating means and the substrate and providing an air path through which the residue toner particles are electrostatically projected from the spray coating means to said substrate.

Another independently significant method aspect of the invention involves the spray coating itself where the material to be sprayed is supplied as segregated toner fines obtained from a photocopier toner manufacturing operation. This end-user method aspect of the invention may be summarized as follows:

A method of utilizing a residue portion of manufactured toner particles deemed unacceptable for photocopying, said method comprising the charge-responsive formation of a coating by:

supplying residue toner particles to charge-responsive spray coating means;
    the supplied residue toner particles having been manufactured by
        manufacturing toner particles,
        segregating the manufactured toner particles into
            toner particles of a size acceptable for photocopying, and
            residue toner particles of a relatively smaller size, not deemed acceptable for photocopying purposes,
        diverting the toner particles considered acceptable for photocopying purposes to toner packaging means for the packaging thereof, and
        diverting the relatively smaller size, residue toner particles considered unacceptable for photocopying purposes to coating material preparation means, this coating material preparation means comprising
            means for packaging the residue toner particles in a format suitable for use in charge-responsive spray coating; and
    electrostatically spraying the residue toner particles from the charge-responsive spray coating means to form a continuous coating on a substrate with,
        an air gap separating the charge-responsive spray coating means and the substrate and providing an air path through which the residue toner particles are electrostatically projected from the spray coating means to the substrate.

As is to be understood, this invention further relates to apparatus counterparts of the above described method aspects of the invention, operable to effectively and separately implement these aspects.

Thus, the apparatus aspect of this invention concerned with the segregation and packaging of photocopier toner fines for subsequent use as charge-responsive spray coating material may be couched in the following terms:

Apparatus for utilizing a residue portion of manufactured toner particles deemed unacceptable for photocopying, this apparatus comprising means for the preparation of material for the charge-responsive coating of articles, such means including:

means for manufacturing toner particles;
    means for segregating the manufactured toner particles into
        toner particles of a size acceptable for photocopying, and
        residue toner particles of a relatively smaller size, not deemed acceptable for photocopying purposes;
    means for diverting the toner particles considered acceptable for photocopying purposes to toner packaging means for the packaging thereof; and
    means for diverting the relatively smaller size, residue toner particles considered unacceptable for photocopying purposes to coating material preparation means, this coating material preparation means comprising
        means for packaging the residue toner particles in a format suitable for use in charge-responsive spray coating;
    the packaged residue toner particles being operable and suitable for charge-responsive spray coating with charge-responsive spray coating means to form a continuous coating on a substrate with, an air gap separating the charge-responsive spray coating means and the substrate and providing an air path through which the residue toner particles are electrostatically projected from the spray coating means to the substrate.

Carrying this basic apparatus aspect forward, a separate apparatus aspect involves the utilization of the segregated and packaged photocopier toner fines in charge-responsive spray coating and involves the following apparatus elements:

means for supplying the residue toner particles to charge-responsive spray coating means; and
  means for electrostatically spraying the residue toner particles from the charge-responsive spray coating mean to form a continuous coating on a substrate with,
    an air gap separating the charge-responsive spray coating means and the substrate and providing an air path through which the residue toner particles are electrostatically projected from the spray coating means to said substrate.

Again, from the standpoint of an end-user, the apparatus aspects of this invention reside in apparatus characterized as follows:

Apparatus for utilizing a residue portion of manufactured toner particles deemed unacceptable for photocopying, this apparatus comprising means for the charge-responsive coating of articles, such means including:

means for supplying residue toner particles to charge-responsive spray coating means;
  the supplied residue toner particles having been manufactured by
    manufacturing toner particles,
    segregating the manufactured toner particles into
      toner particles of a size acceptable for photocopying, and
      residue toner particles of a relatively smaller size, not deemed acceptable for photocopying purposes,
    diverting the toner particles considered acceptable for photocopying purposes to toner packaging means for the packaging thereof, and
    diverting the relatively smaller size, residue toner particles considered unacceptable for photocopying purposes to coating material preparation means, this coating material preparation means comprising
      means for packaging the residue toner particles in a format suitable for use in charge-responsive spray coating; and
  means for electrostatically spraying the residue toner particles from the charge-responsive spray coating means to form a continuous coating on a substrate with,
    an air gap separating the charge-responsive spray coating means and the substrate and providing an air path through which the residue toner particles are electrostatically projected from the spray coating means to the substrate.

Having summarized basic method and apparatus aspects of the invention, it is appropriate at this juncture to enter into a discussion of presently preferred embodiments of the invention. This discussion will be preceded by reference to appended drawings which schematically illustrate elements of the invention.

DRAWINGS

In the drawings:
FIG. 1 provides a schematic flow diagram, illustrating the apparatus elements of the invention and pictorially indicating the sequence of method steps.

DETAILED DESCRIPTION OF PRESENTLY PREFERRED EMBODIMENTS

Figure 1:
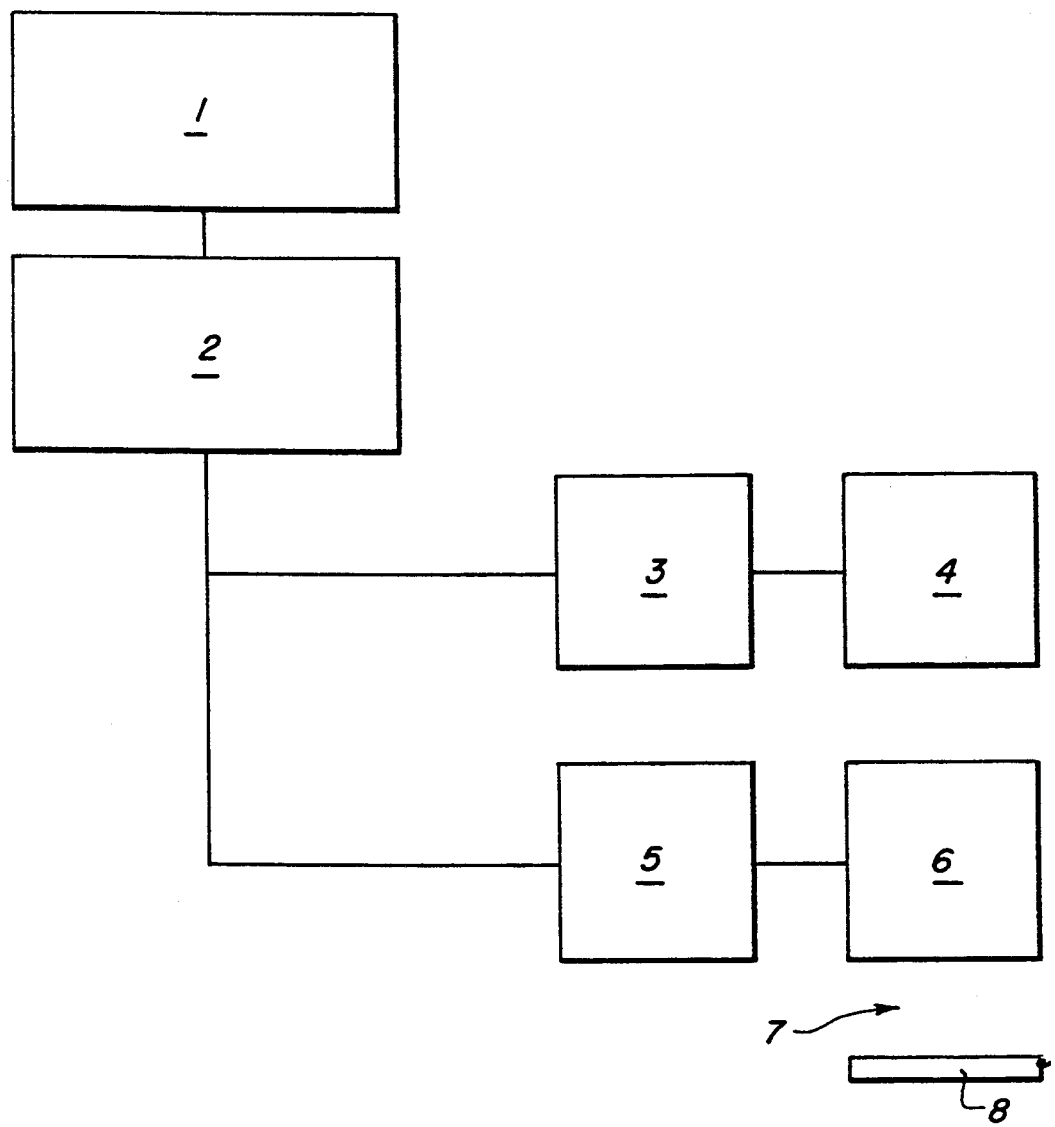

In describing presently preferred embodiments of the invention, reference will first be made to a schematic overview of the invention, following which detailed apparatus and method aspects will be reviewed.

Overview

FIG. 1 schematically depicts an overall toner manufacturing operation including unique aspects of this invention directed to the diversion and segregation of fines for toner residue considered unacceptable for photocopier operations.

As is schematically depicted in FIG. 1, the diverted fines or toner residue are segregated and packaged in a form suitable for subsequent charge-responsive spray coating operations.

As depicted in FIG. 1, conventional toner particle manufacturing operations are conducted using state-of-the-art technology and in toner manufacturing process 1.

Conventional particle sizing apparatus of the type currently employed to establish acceptable particle sizes for photocopier operations is employed at sizing operation or process 2 for the purpose of segregating manufactured toner particles into particles properly and adequately sized for photocopier operations and fines deemed unacceptable for this purpose.

The particles deemed acceptable for photocopier operations are transmitted to conventional state of the art toner particle packaging means 3 for subsequent transmittal to end-user photocopier operations 4.

The toner fines diverted by sizing station 2 are segregated and diverted to a state-of-the-art packaging system 5 where they are packaged in a form suitable for subsequent spray coating operations. This packaging may comprise bulk packaging or packaging suitable for individual end-user applications.

Whatever the form of packaging, the diverted and segregated photocopier toner fines or dry particles are ultimately transmitted to an end-user spray coating operation 6 where they are spray coated across an air gap 7 to surface means 8 to form a decorative and/or protective surface coating.

Where the toner material is of a black nature, i.e., the most common type of toner material employed in photocopier operations, the spray coating operation 6 will produce a lustrous, black protective coating of a highly attractive and useful nature.

By way of understanding the nature of the sizing operation taking place at sizing station 2, the following tabulation presents representative particle size measurements for two separate toner manufacturing batches, these measurements having been made of the toner fines segregated or diverted at the station 2 from the acceptably sized materials passing on to the photocopier toner packaging operation 3. This table, presenting what are believed to be representative samples of toner fine sizing is as follows:

| (μm) Size Range | Batch 1 Number of Toner Particles | Batch 2 Number of Toner Particles |
| --- | --- | --- |
| <2.52 | 14283 | 1442 |
| 2.52–3.17 | 15598 | 1316 |
| 3.17–4.00 | 10550 | 1527 |
| 4.00–5.04 | 22951 | 4885 |
| 5.04–6.35 | 19721 | 23267 |
| 6.35–8.00 | 6993 | 32094 |
| 8.00–10.08 | 867 | 25444 |
| 10.08–12.70 | 28 | 8925 |
| 12.70–16.00 | 6 | 1044 |
| 16.00–20.20 | 1 | 54 |
| 20.20–25.40 | 1 | 2 |
| 25.40–32.00 | 0 | 0 |
| 32.00–40.3 | 1 | 0 |
| 40.3–50.8 | 0 | 0 |
| Median Size | 3.9 μm | 7.2 μm |

As will be seen from the foregoing compilation, the median population of particle fines has a general value which may be considered to be generally less than ten micrometers in diameter.

With respect to the nature of the segregated toner fines or residue particles, these comprise dry particles sized out of the product resulting from conventional toner manufacturing operations.

While a wide variety of resins, pigments, etc., are included in photocopier toner material, the following tabulation depicts the sort of materials which are commonly encountered:

| Resins | Pigments | Other |
| --- | --- | --- |
| Polystyrene | Iron oxides | Dyes |
| Acrylics | Carbon Black | Waxes |
| Epoxies | Organic and | Charge Agents |
| Polyesters | Inorganic pigments | Silica |
| Ionomers | | Low molecular weight polyethylene |
| Polyurethanes | | Stearates |
| Styrene-butadiene | | Low molecular weight Polypropylene |
| Styrene-N-Butyl-Methacrylate | | Silicones |
| Styrene-2-Ethyl Hexyl Acrylate | | |
| Styrene-n-Butyl Acrylate | | |

With respect to charge-responsive spray coating performed by an end-user, as schematically depicted at station 6, the following table is exemplary of the type of charge-responsive spray coating equipment deemed acceptable for spray coating toner residue or fines in accordance with the present invention:

| Manufacturer | Spray Apparatus Model |
| --- | --- |
| Ransburg Gema, Inc. P.O. Box 88220 Indianapolis, Indiana 46208 | Type 701, 702, and/or 705 |
| Sames Electrostatic, Inc. 11998 Merriman Road Livonia, MI 48150 Tel. 800-241-8777 | JRN 404A, MPS-100, LPS-100, SRV 414 |
| Nordson | VERSA-SPRAY System |
| Iontech Tel. 513-421-0008 | Type 3600 Series |
| Intec-APC Tel. 215-484-4789 | Tribo Spray Gun |

Having provided this overview of the basic inventive concept of the invention in the context of a delineation of exemplary sizes for spray coating material comprising toner fines, toner fine material constituents, and commercially available charge-responsive spray coating apparatus suitable for spray coating photocopier fines, it is now appropriate to delineate apparatus and method aspects of the invention.

Apparatus Aspects

Apparatus aspects of the invention may be summarized as set forth in the following narration.

Apparatus for utilizing a residue portion of manufactured toner particles deemed unacceptable for photocopying is provided. This apparatus comprises means for the preparation of material for the charge-responsive coating of articles, such means including:

means 1 for manufacturing toner particles;

means 2 for segregating the manufactured toner particles into toner particles of a size acceptable for photocopying, and residue toner particles of a relatively smaller size, not deemed acceptable for photocopying purposes;

means 2 for diverting the toner particles considered acceptable for photocopying purposes to toner packaging means 3 for the packaging thereof; and means 2 for diverting the relatively smaller size, residue toner particles considered unacceptable for photocopying purposes to coating material preparation means 5, this coating material preparation means comprising means 5 for packaging the residue toner particles in a format suitable for use in charge-responsive spray coating;

the packaged residue toner particles being operable and suitable for charge-responsive spray coating with charge-responsive spray coating means 6 to form a continuous coating on a substrate 8 with, an air gap 7 separating the charge-responsive spray coating means 6 and the substrate 8 and providing an air path 7 through which the residue toner particles are electrostatically projected from the spray coating means 6 to the substrate 8.

Carrying this basic apparatus aspect forward, a separate apparatus aspect involves the utilization of the segregated and packaged photocopier toner fines in charge-responsive spray coating and involves the following apparatus elements:

means 5, 6 for supplying the residue toner particles to charge-responsive spray coating means 6; and means 6 (i.e. the usual control system associated with a spray gun) for electrostatically spraying the residue toner particles from the charge-responsive spray coating means 6 to form a continuous coating on a substrate with, an air gap 7 separating the charge-responsive spray coating means 6 and the substrate 8 and providing an air path 7 through which the residue toner particles are electrostatically projected from the spray coating means 6 to the substrate 8.

Again, from the standpoint of an end-user, the apparatus aspects of this invention reside in apparatus characterized as follows:

Apparatus for utilizing a residue portion of manufactured toner particles deemed unacceptable for photocopying, this apparatus comprising means for the charge-responsive coating of articles, and including:

means 5, 6 for supplying residue toner particles to charge-responsive spray coating means 6;

the supplied residue toner particles having been manufactured by manufacturing toner particles, segregating the manufactured toner particles into toner particles of a size acceptable for photocopying, and residue toner particles of a relatively smaller size, not deemed acceptable for photocopying purposes, diverting the toner particles considered acceptable for photocopying purposes to toner packaging means 3 for the packaging thereof, and diverting the relatively smaller size, residue toner particles considered unacceptable for photocopying purposes to coating material preparation means, this coating material preparation means comprising means 5 for packaging the residue toner particles in a format suitable for use in charge-responsive spray coating; and means 6 for electrostatically spraying the residue toner particles from the charge-responsive spray coating means to form a continuous coating on a substrate 8 with, an air gap 7 separating the charge-responsive spray coating means 6 and the substrate 8 and providing an air path 7 through which the residue toner particles are electrostatically projected from the spray coating means 6 to the substrate 8.

Method Aspects

Basic Method aspects of the invention, in the context of presently preferred embodiments and the schematic presentation of FIG. 1 may be summarized as follows:

A method of utilizing a residue portion of manufactured toner particles deemed unacceptable for photocopying, this method comprising the preparation of material for the charge-responsive formation of a coating by:

manufacturing toner particles;

segregating the manufactured toner particles into toner particles of a size acceptable for photocopying, and residue toner particles of a relatively smaller size, not deemed acceptable for photocopying purposes;

diverting the toner particles considered acceptable for photocopying purposes to toner packaging means 3 for the packaging thereof; and diverting the relatively smaller size, residue toner particles considered unacceptable for photocopying purposes to coating material preparation means 5, this coating material preparation means comprising means 5 for packaging the residue toner particles in a format suitable for use in charge-responsive spray coating;

the packaged residue toner particles being operable and suitable for charge-responsive spray coating with charge-responsive spray coating means 6 to form a continuous coating on a substrate 8 with, an air gap 7 separating the charge-responsive spray coating means 6 and the substrate 8 and providing an air path 7 through which the residue toner particles are electrostatically projected from the spray coating means 6 to the substrate 8.

An additional, independently significant method aspect of the invention, entailing the utilization of the segregated and packaged toner fines for charge-responsive spray coating involves, in addition to the foregoing basic method aspect, the following:

supplying the residue toner particles to charge-responsive spray coating means 6; and electrostatically spraying the residue toner particles from the charge-responsive spray coating means 6 to form a continuous coating on a substrate 8 with, an air gap 7 separating the charge-responsive spray coating means 6 and the substrate 8 and providing an air path 7 through which the residue toner particles are electrostatically projected from the spray coating means 6 to the substrate 8.

Another independently significant method aspect of the invention involves the spray coating itself, where the material to be sprayed is supplied as segregated toner fines obtained from a photocopier toner manufacturing operation. This end-use user method aspect of the invention may be summarized as follows:

A method of utilizing a residue portion of manufactured toner particles deemed unacceptable for photocopying, this method comprising the charge-responsive formation of a coating by:

supplying residue toner particles to charge-responsive spray coating means;

the supplied residue toner particles having been manufactured by manufacturing toner particles, segregating the manufactured toner particles into toner particles of a size acceptable for photocopying, and residue toner particles of a relatively smaller size, not deemed acceptable for photocopying purposes, diverting the toner particles considered acceptable for photocopying purposes to toner packaging means 3 for the packaging thereof, and;

diverting the relatively smaller size, residue toner particles considered unacceptable for photocopying purposes to coating material preparation means 5, this coating material preparation means comprising means 5 for packaging the residue toner particles in a format suitable for use in charge-responsive spray coating; and electrostatically spraying the residue toner particles from charge-responsive spray coating means 6 to form a continuous coating on a substrate 8 with, an air gap 7 separating the charge-responsive spray coating means 6 and the substrate 8 and providing an air path 7 through which the residue toner particles are electrostatically projected from the spray coating means 6 to the substrate 8.

SUMMARY OF ADVANTAGES, NONOBVIOUSNESS, AND SCOPE OF INVENTION

This invention uniquely enables those practicing the photocopier toner manufacturing art to treat what had heretofore been considered as a waste material as a revenue generating by-product.

Moreover, the problems associated with waste disposal of unwanted toner fines is obviated through the present invention in that these materials, instead of requiring disposal, now may be effectively employed as coating media.

From the standpoint of the public-at-large, the present invention is uniquely beneficial in reducing the imposition on limited waste disposal facilities, heretofore required in connection with conventional toner manufacturing operations.

With respect to non-obviousness of the invention, the state of the prior art as outlined in the opening part of the specification starkly demonstrates that in the toner manufacturing art per se, there does not appear to be any recognition of the unique utilization of toner residue or toner fines in charge-responsive spray coating, as proposed through this invention.

With respect to the scope of the invention, those skilled in the toner manufacturing art and familiar with this disclosure may well recognize additions, deletions, substitutions, equivalents, and other variations which would fall within the scope of the invention, deemed to be set forth in the appended claims.

What is claimed is:

1. A method of utilizing a residue portion of manufactured toner particles which are generally of a size unacceptable for photocopying, said method comprising the charge-responsive formation of a coating by:
   manufacturing toner particles;
   segregating said manufactured toner particles into
      toner particles generally of a size acceptable for photocopying purposes, and
      residue toner particles generally of a smaller size not acceptable for photocopying purposes;
   diverting said toner particles which are generally of a size acceptable for photocopying purposes to toner packaging means for the packaging thereof;
   diverting said residue toner particles to coating material preparation means comprising
      means for packaging said residue toner particles for use in charge-responsive spray coating;
   supplying said residue toner particles to charge-responsive spray coating means; and
   electrostatically spraying said residue toner particles from said charge-responsive spray coating means to form a continuous coating on a substrate with,
      an air gap separating said charge-responsive spray coating means and said substrate and providing an air path through which said residue toner particles are electrostatically projected from said spray coating means to said substrate.

2. A method of utilizing a residue portion of manufactured toner particles which are generally of a size unacceptable for photocopying, said method comprising the preparation of material for the charge-responsive formation of a coating by:
   manufacturing toner particles;
   segregating said manufactured toner particles into
      toner particles generally of a size acceptable for photocopying purposes, and
      residue toner particles generally of a smaller size not acceptable for photocopying purposes;
   diverting said toner particles which are generally of a size acceptable for photocopying purposes to toner packaging means for the packaging thereof;
   diverting said residue toner particles to coating material preparation means comprising
      means for packaging said residue toner particles for use in charge-responsive spray coating;
   said packaged residue toner particles being operable and suitable for charge-responsive spray coating with charge-responsive spray coating means to form a continuous coating on a substrate with,
      an air gap separating said charge-responsive spray coating means and said substrate and providing an air path through which said residue toner particles are electrostatically projected from said spray coating means to said substrate; and
   using charge-responsive spray coating means, spray coating an article with said diverted and packaged, residue toner particles.

3. A method of utilizing a residue portion of manufactured toner particles which are generally of a size unacceptable for photocopying, said method comprising the charge-responsive formation of a coating by:
   supplying residue toner particles to charge-responsive spray coating means;
   said supplied residue toner particles having been manufactured by
      manufacturing toner particles,
      segregating said manufactured toner particles into
         toner particles generally of a size acceptable for photocopying purposes, and
         residue toner particles of a smaller size not acceptable for photocopying purposes;
      diverting said toner particles which are generally of a size acceptable for photocopying purposes to toner packaging means for the packaging thereof;
      diverting said residue toner particles to coating material preparation means comprising
         means for packaging said residue toner particles for use in charge-responsive spray coating; and
   electrostatically spraying said toner particles from said charge-responsive spray coating means to form a continuous coating on a substrate with
      an air gap separating said charge-responsive spray coating means and said substrate and providing an air path through which said residue toner particles are electrostatically projected from said spray coating means to said substrate.

4. A method as described in claim 3 wherein:
said charge-responsive spraying comprises electrostatic, dry particle spraying; and
said residue toner particles have a median particle size not exceeding about ten micrometers.

* * * * *